April 29, 1958  J. J. BLACK  2,832,636
ELEVATING SYSTEM FOR TRAILER CENTER DECK
Filed Feb. 6, 1956  2 Sheets-Sheet 1
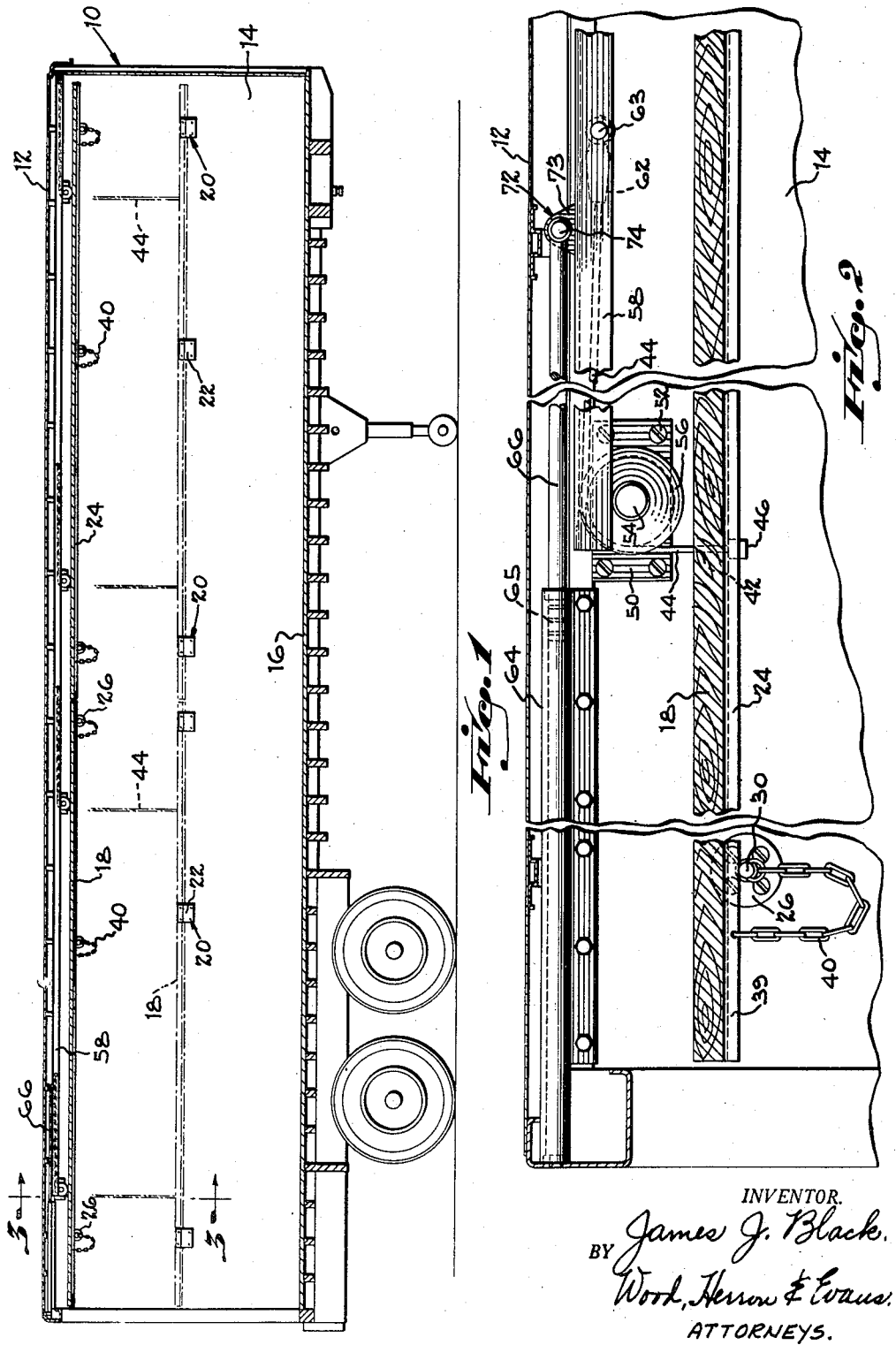
INVENTOR.
BY James J. Black.
Wood, Herron & Evans.
ATTORNEYS.

April 29, 1958          J. J. BLACK          2,832,636
ELEVATING SYSTEM FOR TRAILER CENTER DECK
Filed Feb. 6, 1956          2 Sheets-Sheet 2
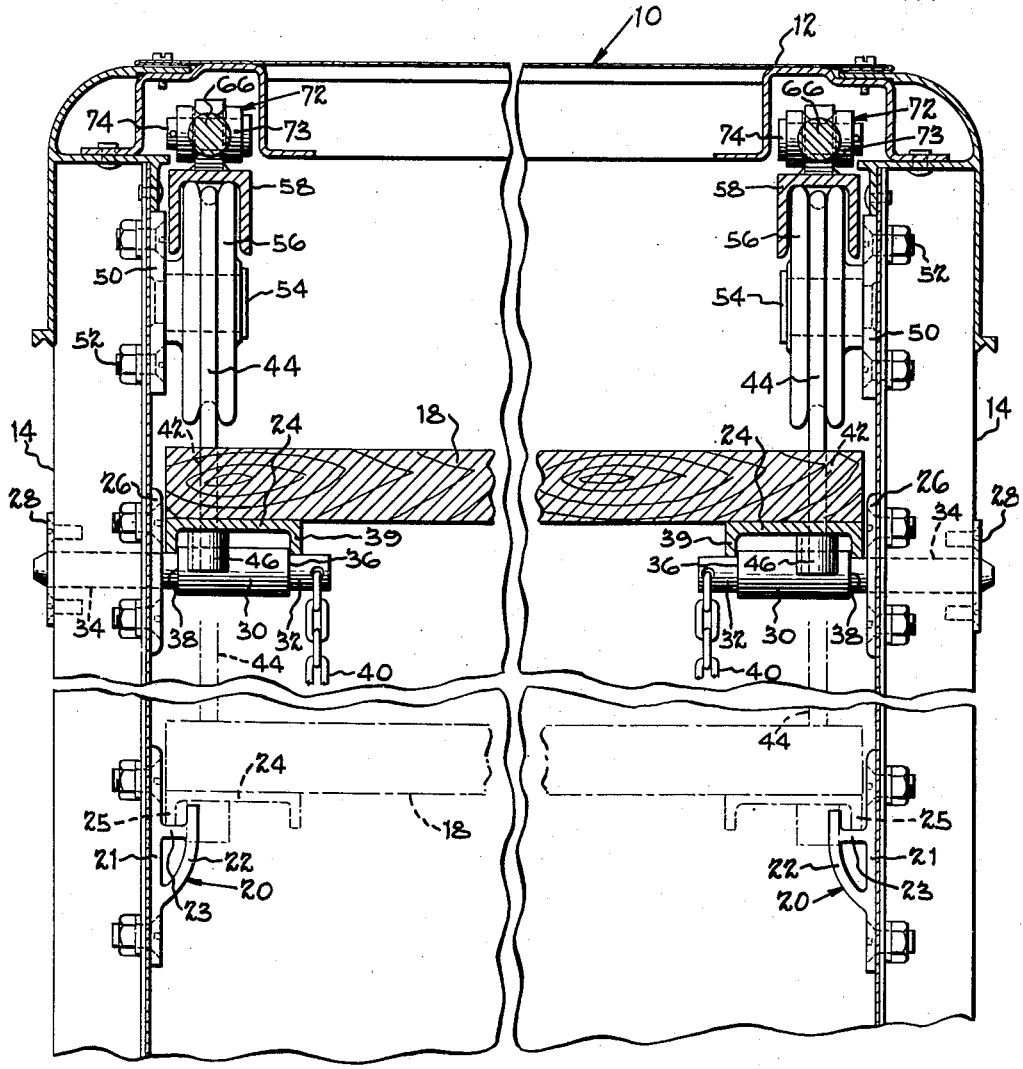
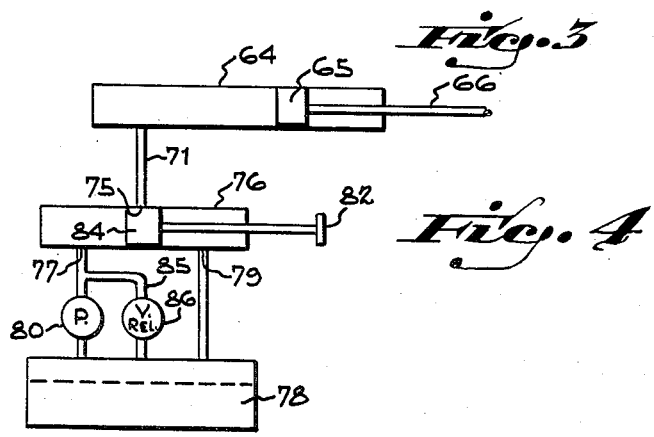
INVENTOR.
James J. Black.
BY Wood, Herron & Evans.
ATTORNEYS.

United States Patent Office 2,832,636
Patented Apr. 29, 1958

2,832,636

ELEVATING SYSTEM FOR TRAILER CENTER DECK

James J. Black, Cincinnati, Ohio, assignor to Trailmobile, Inc., Cincinnati, Ohio, a corporation of Delaware Application February 6, 1956, Serial No. 563,494

10 Claims. (Cl. 296—12)

This invention relates to vehicles for transporting livestock and is directed particularly to a roadway vehicle having an elevatable deck or floor.

In transporting large cattle, such as cows and horses, the full interior height of the roadway vehicle is required. However, a lesser height is all that is needed for transporting smaller animals such as hogs and sheep. In the past, vehicles have been employed which comprise a vertically shiftable floor in addition to a permanent floor. This shiftable floor has either been removable from the vehicle or positioned therein as a false floor or ceiling during use of the vehicle for the transportation of large animals, but whenever smaller size animals were to be carried, the shiftable floor was either reinserted or moved to an intermediate position to provide two decks or floors, thereby doubling the vehicle capacity.

The intermediate floor or deck has to be strong, and therefore, it is heavy. While various mechanical arrangements have been proposed to shift the deck or floor in a vertical direction with respect to the vehicle, none have been satisfactory either because they are too cumbersome and too expensive to make, or because the mechanism is too difficult to fabricate or to maintain. Some previous constructions have required expensive machined elements such as sprocket and chain arrangements or long gear linkage systems. Still others use a plurality of vertically directed telescoping hydraulic piston and cylinder arrangements acting directly on the shiftable floor, but these have had the disadvantage of being complex, thereby making the apparatus too expensive for ordinary commercial usage. In arrangements using cables connected to the shiftable floor, the body of the vehicle has had to be considerably reconstructed to allow for installation. Similarly, in removable floor systems a multiplicity of floor panels has been required in order that each would be small enough to be handled manually.

The principal objective of this invention has been to provide a simple and inexpensive mechanical means for elevating the deck of a vehicle which does not exhibit the disadvantages characteristic of past constructions.

A further objective of this invention has been to provide a center deck system for roadway vehicles in which the center deck, when not in use, may be stored at, or adjacent, the roof of the vehicle, and of providing a cable system for raising and lowering the deck, which system is easy to fabricate and easy to maintain.

It is a further objective of this invention to provide a cattle-carrying vehicle or car having a permanent floor and a shiftable floor, and an improved mechanism for raising and lowering the shiftable floor, which mechanism includes a plurality of cables fixed to the shiftable floor and longitudinally movable actuating members, with a plurality of pulleys not only supporting the cables for substantially frictionless movement but also supporting the actuating members for substantially frictionless movement.

These and other objectives will become more apparent in the light of the accompanying drawing and specification which illustrates a preferred embodiment of the invention.

In the drawings:

Figure 1 is a cross-sectional view of a vehicle body showing the shiftable floor in two positions;

Figure 2 is a cross-sectional view, partially in broken section, showing how the shiftable floor is supported;

Figure 3 is a cross-sectional view taken on the line 3—3 of Figure 1 showing a partially transverse section of a vehicle body; and Figure 4 is a cross-sectional view of the hydraulic mechanism for operating the shiftable floor.

Briefly stated, this invention contemplates a vehicle having a permanent floor and a shiftable floor which is supported on cables connected to longitudinally movable actuating members. However, in the present construction both members and cables are supported on pulleys which thereby serve as sheaves to guide the cables and as rollers to support the members through which the cables are operated.

Although the invention is described in connection with a semi-trailer, it is to be understood that the mechanism can be utilized in connection with any type of vehicle platform, floor, or deck requiring vertical movement.

Referring to the drawing, the numeral 10 generally designates a trailer having a body 12 provided with panelled side walls 14 which act as a support for the roof and for the center deck as subsequently described. A permanent floor is shown at 16, and a vertically shiftable floor or center deck is shown at 18 in its uppermost position. The shiftable floor 18 is also shown in phantom at its lowermost position.

In order to support the shiftable floor 18 at its lowermost or "center" deck position, a plurality of brackets 20, as best seen in Figures 1 and 3, are shown fixed at an appropriate elevation along the inner side walls 14 of the vehicle. Each of the brackets 20 has a base 21, an upwardly extending arm portion 22, and a cross strap or rest portion 23 for supporting the floor at the underside thereof. Any number of brackets 20 can be located along the side walls 14 sufficient to safely support the weight of the cattle to be transported under the varying conditions encountered in roadway travel. The underside of the shiftable floor 18 contains two longitudinally extending channel-shaped supporting members 24 residing along the respective sides of the floor panel and as many more intermediate structural members as are necessary to provide adequate strength. At the center position of deck 18, the outer flanges 25 of the channel 24 rest on the cross portions 23 of brackets 20, while the bracket arms 22 extend into the channels to limit sidewise movement.

Whenever the shiftable floor is not in use as a center deck, it is supported at its uppermost position by inner brackets 26 and outer brackets 28. Each pair of brackets, 26 and 28, is fixed to the walls 14 of the body 12 by screws or bolts in order to provide sufficient lateral support for load-carrying pins 30. The pins 30 extend through aligned openings in the brackets 26 and 28 suitably fastened to the inner and outer side walls of the vehicle. Each pin 30 is also provided with counter-turned portions 32 and 34 so as to provide shoulders 36 and 38 which reside between the side flanges 39 of the channel-shaped members 24. In this manner, the pins 30 are retained against escape from the apertures in which they are carried. A retaining chain 40 connects each pin 30 to an adjacent channel-shaped member 24 so that the pins will not become lost when not in use.

The shiftable floor 18 is provided with openings 42 along the longitudinal edges thereof. Cables 44 pass through each of the openings 42 in order to elevate and lower the floor. Each of the cables is prevented from coming through the openings in the floor by a head 46 being fixed thereto by welding or the like. The cables, therefore, are in weight-supporting connection with the floor 18.

Brackets 50 are secured to the inside wall 14 of the panel body 12, the brackets being fastened by suitable bolts 52 or the like, there being one bracket for each cable 44. Each bracket has a shaft or axle 54 extending rigidly therefrom upon which is journaled a sheave or pulley 56. The pulleys thus reside in vertical planes closely adjacent the vertical interior walls, and in the preferred construction, the pulleys along each side wall are in alignment in horizontal rows.

Cables 44 pass upwardly from the center deck 18 generally in vertical direction and are respectively threaded over the pulleys 44. To actuate the cables in unison along each side wall for raising and lowering the center deck, longitudinal cable actuators 58 are rested on the rotatable pulley peripheries of the respective rows along each side wall of the vehicle. Thus, the actuator members 58 track upon the peripheries of the pulleys in the respective rows so as to be supported thereby for linear movement in a substantially frictionless manner.

As shown in Figure 3, in the preferred construction the members 58 are channel-shaped in cross section, with the central webs of the channels engaging the pulley peripheries while the respective side edges of the channels depend along the outer sidewise faces of the pulleys, whereby the pulleys not only support the members 58 for linear movement but also limit the channels against sidewise escape.

In the alternative, if desired, instead of having the pulley peripheries engage the central webs of the channels, the pulleys may be equipped with hubs projecting endwisely from the sheave portions of the pulleys for engagement by the lower edges of the channel flanges. In this arrangement, the parts may be dimensioned so that the central webs of the channels are spaced from the peripheries of the sheave portions of the pulleys. However, in the arrangement disclosed in the drawing, it will be noted that the central web riding on the pulley peripheries confines the cable within the sheave groove so as to positively prevent its sidewise escape from the pulley should the cable become loose for any reason.

The portions of cables 44 passing over and beyond the pulleys extend in horizontal direction along the underneath faces of the actuator members 58, and the cables are rigidly connected thereto. For this purpose, one suitable arrangement is shown in Figure 2; the free end of each cable has a clevis 62 swaged to it, which clevis receives a clevis pin or bolt 63 passed through the side flanges of the channel-shaped actuator 58.

By this construction, it will be seen that the weight load of the center deck 18 is carried by the pulleys over which the cables pass, and that the pulleys also serve as rollers along which the actuator bars are linearly movable. Therefore, a system which is notably free from friction is provided for moving the cables in unison. It will also be noted that the pulleys serve a double function, as sheaves for the cables whereby horizontal movement of the cables is effective to cause a vertical lift or fall of the center deck, and as roller supports for the actuator members 58 through which the horizontal movement of the cables is effected. Such apparatus is located in an elevated, out-of-the-way position in the trailer vehicle. It occupies very little space and requires virtually no maintenance except occasional oiling of the pulleys.

The thrust members or actuators 58 may be driven individually or in unison in any suitable manner, for instance by a central crank, by electric power, through a screw or rack and pinion, or by an hydraulic or pneumatic power cylinder. Mechanism of the latter type is disclosed herein comprising one or more hydraulic cylinders 64 each having a piston 65 therein. Preferably, each thrust member 58 is served by its individual power motor, but the motors are operated in unison from a central power fluid source so as to eliminate any need for synchronizing them. As shown, in each power cylinder the piston 65 is connected to a piston rod 66, the cylinder and piston rod being dimensioned or arranged to move the actuator through a stroke having a length at least equal in distance to the intended movement of the center deck from its lowermost position to its uppermost position. Piston rod 66 of each power cylinder is connected to its thrust member 58 by means of a bracket 72 comprising spaced side arms 73 carrying a cross pin 74 which passes through an aperture in the piston rod head. It will be understood that only one power cylinder may be employed to serve both actuators if desired.

Any suitable hydraulic system may be utilized for controlling operation of the hydraulic power motors; one such is shown diagrammatically in Figure 4. According to this arrangement, a conduit 71 is connected to one end of the cylinder. The conduit is in turn connected to a two-position control valve 76 having ports 75, 77 and 79 extending therethrough so as to connect the conduit 71 to a reservoir 78 or to a pump 80 as desired. The piston 84 in the pilot valve is responsive to movement of the control handle 82. The pump 80 may be operated by a power take-off (not shown) from the motor of the vehicle through a clutch mechanism, so as to operate the pump as such times as are desirable or a by-pass line 85 containing a pressure relief valve 86 may be installed between the pressure outlet side of the pump and the reservoir 78. The control handle 82 may be at a convenient place on the vehicle.

The shiftable deck 18 when not in use is normally carried at its uppermost position, as shown in Figure 3, so as to be stored in an out-of-the-way position. The deck is fixed in this position by the pins 30. When the deck is in this uppermost position the vehicle is capable of transporting large animals such as horses and cows. However, when it is desirable to carry small animals such as pigs and sheep, the deck can be lowered to an intermediate position. This is accomplished by first moving the control valve handle 82 to the right so that the piston 84 uncovers the port 75. The cylinders 64 are then open to the pump 80, and hydraulic fluid under pressure enters the cylinders to force the piston 65 and actuating arms 58 to the right. This movement pulls the horizontal cable runs to the right, thereby lifting the vertical cable runs sufficiently to raise the floor 18 slightly and disengage the channel-shaped members 24 from the pins 30. The pins 30 then can readily be removed manually. The shiftable floor 18 is then lowered by shifting the control handle to the left so as to drain the cylinders 64 through port 79 with the reservoir 78. The weight of the shiftable floor on the cables, which is in turn exerted on the actuating arms 58, is sufficient to force hydraulic fluid into the reservoir 78. When the floor has reached the lower position the pilot control valve 76 is placed at its off position so as to cover port 75. The floor will then ride on the arms 22 of the brackets 20. The sheep and hogs can then be loaded on the shiftable floor or deck 18 as well as the permanent floor 16.

While a particular embodiment of the invention has been illustrated and described, it will be obvious to those skilled in the art that various changes and modifications may be made without sacrificing the advantages provided by the principle of construction disclosed herein.

Having described my invention, I claim:

1. In a vehicle of the center deck type for hauling cattle, a mechanism for actuating the center deck comprising power motors respectively providing linear power strokes, elongated members respectively connected to said power motors for movement thereby, flexible cables respectively connected to said elongated members at points spaced longitudinally thereof, sets of rotatable sheaves respectively mounted at the sides of said vehicle above the center deck of the vehicle, each sheave having a respective one of said cables passed over it and depending therefrom, the sheaves in each of said respective sets being aligned generally in horizontal rows extending longitudinally of said vehicle, said sets of sheaves in common respectively providing tractional support for said elongated members throughout their ranges of movement, and means supporting said center deck from said cables whereby said sheaves movably support the elongated members while the elongated members sustain and actuate the cables and the cables sustain and actuate the center deck.

2. In a vehicle adapted for hauling cattle and having a main deck and a liftable deck movable vertically from an inactive to an active position, means for operating the liftable deck comprising a plurality of pulleys supported individually by the vehicle and arranged at each side of the vehicle in generally horizontal rows extending longitudinally of the vehicle above said liftable deck, an elongated member tractionally supported by the pulleys in each row and movable thereon throughout a range corresponding to the distance through which said liftable deck is movable, cable members having endwise portions respectively thereof connected to the elongated members and opposite endwise portions thereof connected with said liftable deck and intermediate portions thereof extending respectively along said elongated members over respective pulleys and vertically toward said liftable deck, and power means for moving said elongated members tractionally along said pulleys in the rows whereby said cables are actuated to raise or lower said liftable deck.

3. In an automotive vehicle having a housing comprising side walls, a main deck, and a liftable deck, the combination of means for raising and lowering said liftable deck from a normally inactive to an operative position wherein it provides a second service deck for the vehicle, said combination comprising rotatable sheaves mounted in rows upon the respective side walls of the vehicle, the rows extending longitudinally thereof, elongated load-supporting members respectively tractionally sustained by at least some of the sheaves in each row, flexible cable members respectively having common endwise portions thereof extending vertically from spaced points on said center deck over said sheaves and respectively along said elongated members into interconnection with the same, and power means for moving said elongated members in unison along said rows of sheaves to effect movement of said liftable deck between its inactive and operative positions.

4. In an automotive vehicle having a housing comprising side walls, a main deck, and a liftable deck, the combination of means for raising and lowering said liftable deck from a normally inactive to an operative position wherein it provides a second service deck for the vehicle, said combination comprising rotatable sheaves mounted in rows upon the respective side walls of the vehicle, the rows extending longitudinally thereof, elongated load-supporting members tractionally sustained by at least some of the sheaves in the respective rows, flexible cable members having common endwise portions thereof respectively extending vertically from spaced points on said liftable deck over the sheaves and along said elongated members into interconnection with the same, power means for moving said elongated members in longitudinal direction in unison to effect movement of said liftable deck between its operative and inactive positions, and stop means associated with the said side walls of the vehicle for supporting the weight load of the liftable deck independently of said elongated members and cables at the respective inactive and operative positions of said liftable deck.

5. In an automotive vehicle comprising wall members, a main deck, and a second deck movable within the wall members above the main deck, the combination of means for raising and lowering said second deck from a normally inactive to an operative position wherein it provides a second service deck for the vehicle load, said combination comprising rotatable, circumferentially grooved pulleys mounted in row alignment upon the respective wall members of the vehicle, elongated load-supporting members having common engagement with peripheral portions of at least some of the pulleys in the respective rows, flexible cable members having common endwise portions thereof respectively extending vertically from spaced points along the sides of said second deck over the pulleys in the grooves thereof into interconnection with the respective elongated members, and power means for moving said elongated members in a longitudinal direction along the row of pulleys to effect movement of said second deck between its inactive and operative positions.

6. An automotive vehicle having a housing comprising side walls, a main deck, and a center deck normally residing in inactive position at an elevation near the top of the side walls but movable downwardly to an active position spaced above the main deck to provide a second service deck, means for effecting movement of the center deck from inactive and active positions and for returning the same after use to inactive position, said means comprising rotatable pulleys arranged in a substantially horizontal row on each side wall of the vehicle housing in spaced relation to one another, elongated members respectively supported tractionally by pulleys in each row for linear movement of each elongated member, flexible cable members extending upwardly from spaced points of said center deck respectively over said pulleys for moving said elongated members in their longitudinal direction upon the rotatable supports provided by said pulleys whereby the center deck is lowered or raised from one of its said positions to the other depending upon the direction of movement imparted to said elongated members by said power means.

7. An automotive vehicle having a housing comprising side walls, a main deck, and a second deck normally residing in inactive position at an elevation near the top of the side walls but movable downwardly to an active position spaced above the main deck to provide a second service deck, means for effecting movement of the second deck from inactive and active position and for returning the same to inactive position after use, said means comprising rotatable pulleys arranged in a substantially horizontal row on each side wall of the vehicle housing above the inactive position of the second deck in spaced relation to one another, elongated members respectively supported tractionally by pulleys in each row for linear movement in the longitudinal direction of each elongated member, flexible cable members extending upwardly from spaced points on said second deck respectively over said pulleys and along said elongated members into interconnection therewith, power means for moving said elongated members in unison upon the rotatable supports provided by said pulleys whereby the second deck is lowered or raised from one of its inactive positions to the other depending upon the direction of movement of said elongated members by said power means, said second deck having channel members along the bottom sidewise edges thereof, and members mounted on the side walls of said vehicle engageable within said channels to support the second deck independently of said cable means.

8. In a vehicle for hauling cattle and the like having a housing comprising a main deck, rigid side walls, and a liftable deck movable from an inactive position to a position intermediate the main deck and the top elevation of the said walls of service as a second deck, means for moving the liftable deck from one of its said positions to the other, comprising rotatable sheaves supported by said vehicle and aligned in rows extending longitudinally adjacent the respective side walls of the vehicle, flexible cable members respectively threaded over the sheaves, respective portions of said cable members extending downwardly from said sheaves into connection with said liftable deck at spaced points thereon, opposite portions of said cables extending unidirectionally from said sheaves in lines generally parallel to the rows of sheaves, elongated members tractionally supported upon the peripheries of the sheaves in each row for linear movement in back and forth directions, the ends of said cables being respectively connected to said elongated members at points thereon respectively spaced from said sheaves, when said liftable deck is at its inactive position, through distances at least equal to the distance between the active and inactive position of said liftable deck, and means for moving said elongated members linearly along the pulleys of the rows through a distance at least equal to said last-named distance whereby linear movement of said elongated members effects movement of said liftable deck between its active and inactive positions.

9. In an automotive vehicle having a housing comprising side walls, a main deck, and a center deck normally residing in inactive position at an elevation near the top of the side walls but movable downwardly to an active position spaced above the main deck to provide a second service deck, means located within said housing above the inactive position of said center deck for effecting movement of the second deck between inactive and active positions, said means comprising rotatable pulleys arranged in spaced relation to one another in a substantially horizontal row on each side wall of the vehicle housing, elongated members rested upon peripheral portions of said pulleys and tractionally movable thereon in a direction longitudinal of said housing, fluid power means for moving said elongated members in unison in their longitudinal direction upon the rotatable supports provided by said pulleys, and a plurality of flexible cables extending respectively from spaced points on said elongated members over said pulleys and into weight-supporting connection with spaced points on said center deck.

10. In an automotive vehicle having a housing comprising side walls, a main deck, and a center deck normally residing in inactive position at an elevation near the top of the side walls but movable downwardly to an active position spaced above the main deck to provide a second service deck, means located within said housing above the inactive position of said center deck for effecting movement of the second deck between inactive and active positions, said means comprising rotatable pulleys arranged in spaced relation to one another in a substantially horizontal row on each side wall of the vehicle housing, elongated members rested upon peripheral portions of said pulleys and tractionally movable thereon in a direction longitudinal of said housing, fluid power means for moving said elongated members in unison in their longitudinal direction upon the rotatable supports provided by said pulleys, and a plurality of flexible cables extending respectively from spaced points on said elongated members over said pulleys and into weight-supporting connection with spaced points on said center deck, said center deck having channel members along the bottom sidewise edges thereof, the side walls of said housing having apertures in alignment at an elevation corresponding to inactive position of said center deck, and stop members removably engageable in said apertures and having shoulders engageable with the channels of said channel members.

References Cited in the file of this patent

UNITED STATES PATENTS

| | | |
|---|---|---|
| 415,255 | Smith | Nov. 19, 1889 |
| 922,208 | Suess | May 18, 1909 |
| 1,094,485 | Shelton | Apr. 28, 1914 |
| 2,696,402 | McDaniel | Dec. 7, 1954 |